(12) United States Patent
Martin Regalado et al.

(10) Patent No.: US 9,140,868 B2
(45) Date of Patent: *Sep. 22, 2015

(54) SUBMARINE OPTICAL COMMUNICATIONS CABLES AND PROCESSES FOR THE MANUFACTURING THEREOF

(75) Inventors: Josep Martin Regalado, Milan (IT); Josep Maria Batlle I Ferrer, Milan (IS); Josep Oriol Vidal Casanas, Milan (IT)

(73) Assignee: PRYSMIAN S.P.A., Milan (IT)

( * ) Notice: Subject to any disclaimer, the term of this patent is extended or adjusted under 35 U.S.C. 154(b) by 149 days.

This patent is subject to a terminal disclaimer.

(21) Appl. No.: 13/809,725

(22) PCT Filed: Jul. 19, 2010

(86) PCT No.: PCT/EP2010/060405
§ 371 (c)(1),
(2), (4) Date: Apr. 22, 2013

(87) PCT Pub. No.: WO2012/010192
PCT Pub. Date: Jan. 26, 2012

(65) Prior Publication Data
US 2013/0202261 A1  Aug. 8, 2013

(51) Int. Cl.
*G02B 6/44* (2006.01)
*B05D 1/26* (2006.01)

(52) U.S. Cl.
CPC .............. *G02B 6/4427* (2013.01); *B05D 1/265* (2013.01); *G02B 6/4416* (2013.01)

(58) Field of Classification Search
CPC ...... G02B 6/4494; G02B 6/443; G02B 6/441; G02B 6/4429; G02B 6/4432; G02B 6/4434
USPC .................................. 385/100, 102, 103, 106
See application file for complete search history.

(56) References Cited

U.S. PATENT DOCUMENTS 4,156,104 A  5/1979  Mondello
5,125,062 A  6/1992  Marlier et al.
(Continued)

FOREIGN PATENT DOCUMENTS

DE  9013175 U1  2/1991
EP  0092980 A2  11/1983
(Continued)

OTHER PUBLICATIONS

ITU-T Telecommunication Standardization Sector of ITU; Series G, ITU-T Recommendation No. G.652, Jun. 2005, pp. i-iii and 1-14.
(Continued)

*Primary Examiner* — Jennifer Doan
(74) *Attorney, Agent, or Firm* — Harness, Dickey & Pierce, PLC

(57) ABSTRACT

A process for manufacturing submarine optical communications cable may include: providing an optical core; providing a reinforcing structure consisting of at least one layer of wires onto the optical core, wherein at least part of the wires are clad with first metallic material; extruding an outer layer onto the reinforcing structure, wherein the outer layer is made of second metallic material having a softening point substantially similar to a softening point of the first metallic material; and cooling the outer layer immediately after extruding the outer layer. A submarine optical cable may include: an optical core comprising a plurality of optical fibers housed in an inner tube; and a reinforcing structure consisting of at least one layer of wires stranded onto the optical core. The cable may be substantially devoid of interstices between the at least one layer of wires and the inner tube.

16 Claims, 3 Drawing Sheets

(56) References Cited

U.S. PATENT DOCUMENTS

| | | | |
|---|---|---|---|
| 5,133,126 A | 7/1992 | Matsuoka | |
| 5,222,173 A | 6/1993 | Bausch | |
| 5,787,217 A | 7/1998 | Traut et al. | |
| 7,386,208 B2 * | 6/2008 | Bosisio et al. | 385/102 |
| 2010/0014818 A1 | 1/2010 | Sales Casals et al. | |

FOREIGN PATENT DOCUMENTS

| | | |
|---|---|---|
| EP | 0099745 A1 | 2/1984 |
| EP | 0467294 A1 | 1/1992 |
| GB | 2101505 A | 1/1983 |
| JP | 59219703 A | 12/1984 |
| WO | WO-0109658 A1 | 2/2001 |
| WO | WO-02054131 A1 | 7/2002 |
| WO | WO-03091782 A1 | 11/2003 |
| WO | WO-2006102910 A1 | 10/2006 |

OTHER PUBLICATIONS

ITU-T Telecommunication Standardization Sector of ITU; Series G, ITU-T Recommendation No. G.655, Nov. 2009, pp. i-iv and 1-17.
International Electronics Commisssion (IEC), IEC 61232 Ed. 1.0, Jun. 9, 1993, pp. 21, 23, and 25.
International Search Report PCT/ISA/210 for International Application No. PCT/EP2010/060405 dated Mar. 25, 2011.
International Search Report PCT/ISA/210 for International Application No. PCT/EP2010/060402 dated Mar. 24, 2011.
International Electrotechnical Commission IEC Publication 60724, pp. B-7,8,9,11,13, C-1,3,5,7,9,11,13, and D-1 to D-6, 1984.

* cited by examiner ial Application No. PCT/EP2010/060405, filed on Jul. 19, 2010,
SUBMARINE OPTICAL COMMUNICATIONS CABLES AND PROCESSES FOR THE MANUFACTURING THEREOF

CROSS-REFERENCE TO RELATED APPLICATION(S)

This application is a national stage entry from International Application No. PCT/EP2010/060405, filed on Jul. 19, 2010, in the Receiving Office of the European Patent Office, the entire contents of which are incorporated herein by reference.

TECHNICAL FIELD

The present invention relates to the field of submarine optical communications networks. In particular, the present invention relates to a submarine optical communications cable and to a process for the manufacturing thereof.

BACKGROUND ART

A submarine optical communications cable is an optical cable suitable for being laid beneath the sea, for implementing a point-to-point optical link supporting exchange of information between two endpoints located ashore.

The point-to-point optical link may be either repeatered or unrepeatered. In the first case, the submarine optical communications cable forming the link merely carries light signals. In the second case, the submarine optical communications cable forming the link carries both light signals and electrical power for supplying the submarine repeaters of the link.

In both cases, construction of a submarine optical communications cable typically comprises an optical core containing optical fibers within an inner tube—generally made of stainless steel, aluminium or polymeric material—surrounded by one or more layer(s) of metal wires encircled, in turn, by an outer aluminium layer. The metal layers protect the optical core against the detrimental effects inherent to installation beneath the sea (especially in deep water), such as for instance moisture penetration and mechanical stresses (in particular, hydrostatic pressure). The one or more layer(s) of wires (typically steel wires) are mainly responsible for the mechanical properties (in particular, the hydrostatic pressure resistance) of the cable.

GB 2101505 discloses a method for manufacturing an optical fiber cable for submarine use, whose optical fiber cable core comprises a plurality of optical fibers held together around a strength member by a preform, and an aluminium tube in which the preform is arranged. A layer of high tensile steel wires are stranded helically over the tube, thereby forming a stranded strength member. An oversize aluminium tube is then directly extruded coaxially over the stranded strength member by a continuous extrusion process. The tube is subsequently drawn down and swung onto the stranded strength member so that the tube material fills at least the interstitial spaces between the wires and is in intimate contact with the layer of stranded wires.

U.S. Pat. No. 4,156,104 discloses a repeatered submarine cable where the cable core is surrounded by an outer strength member formed by a plurality of stranded steel wires which are successively wrapped in superimposed layers around the outer diameter of the core. A non-porous conductive jacket of aluminium or copper is then formed directly over the outer layer of stranded wires. The jacket surrounding the steel wires forms a DC conducting path for powering optical repeaters spaced at intervals along the cable, and also serves as a moisture barrier for the optical transmission lines disposed in the cable.

EP 0 092 980 discloses an overhead earth conductor comprising a central core of aluminium formed from a single extrudate of substantially C-shaped transverse cross-section whose limbs have been folded inwardly so that the gap between the free ends of the limbs is closed and the central core is of substantially circular cross-section. Extending through the length of the central core is an elongated compartment in which is loosely housed an optical fiber. A layer of galvanized steel wires surrounds the central core, the wires being helically laid around the central core. A circumferentially continuous outer layer of aluminium surrounds the layer of galvanized steel wires, the outer layer being formed from a single extrudate of substantially C-shaped transverse cross-section whose limbs have been folded inwardly so that the gap between the free ends of the limbs is closed. Aluminium of the central core and aluminium of the outer layer partially fills the interstices between the steel wires. Spaces of the interstices between the galvanized steel wires not occupied by aluminium are substantially filled with water-impermeable grease.

SUMMARY OF THE INVENTION

The Applicant has noticed that the above known cables exhibit empty interstices around the wires comprised in their structures. Such interstices are undesirable, because they may expose the cable to moisture penetration.

In view of the above, the Applicant has tackled the problem of providing a submarine optical communications cable comprising a reinforcing structure of at least one layer of wires, having substantially all of the interstices possibly present in the cable filled with metal, in particular the interstices between the reinforcing structure and the inner tube, which are not filled in the prior art cables.

Further, the Applicant has tackled the problem of providing a process for manufacturing a submarine optical communications cable comprising a reinforcing structure of at least one layer of wires, that allows substantially completely filling the interstices between the wires and the inner and outer layers, that is as simple as possible and that minimizes the risk of damaging the optical fibers contained in the cable during manufacturing.

This problem is solved by a process for manufacturing a submarine optical communications cable, wherein at least part of the wires are clad with a first metallic material, and wherein an outer layer of a second metallic material having a softening point substantially similar to that of the first metallic material of the wire claddings is extruded onto the outer layer of wires, and is cooled just after extrusion.

In the present description and in the claims, the expression "at least part of the wires are clad" means that, if R is the number of wires comprised in a cable, K wires are clad, K being lower than or equal to R and being such that the cable does not comprise two adjacent unclad wires.

Further, in the present description and in the claims, as "softening point of a metallic material" it is meant a temperature at which the metallic material can be extruded, such temperature being in a range of from 50% to 75% of the melting point of the metallic material.

In the present description and in the claims, the concept of a metallic material having a softening point substantially similar to that of another metallic material means that the softening temperature ranges of the metallic materials in question at least partially overlap.

During extrusion of the outer layer, the claddings of the wires soften and substantially completely fill the interstices among the wires and the interstices between the wires and outer surface of the underlying layer.

The extrusion of the outer layer is advantageously performed under pressure, in order to facilitate the filling of said interstices.

The softened metallic material of the claddings fuses together with the softened extruded metallic material of the outer layer, so that formation of interstices between the reinforcing wires and the outer layer is advantageously prevented.

The ensemble wires/outer layer substantially devoid of interstices advantageously behaves as an integral, highly efficient barrier against moisture penetration, and imparts optimal mechanical properties to the cable.

The step of cooling the outer layer just after extrusion advantageously allows preventing possible damages to the optical core, for example to the optical fibers, but also to the inner tube housing them.

Hence, differently from the known processes, the process according to embodiments of the present invention advantageously allows filling all the interstices substantially without leaving any free space, and prevents formation of the interstices between the wires and the outer tube. This is achieved by a single manufacturing step (i.e. extrusion of the outer layer), and accordingly the process is advantageously very simple.

According to a first aspect, the present invention relates to a process for manufacturing a submarine optical communications cable, the process comprising the steps of:

a) providing an optical core;

b) providing a reinforcing structure consisting of at least one layer of wires onto the optical core, at least part of the wires being clad with a first metallic material;

c) extruding an outer layer onto the reinforcing structure consisting of at least one layer of wires, the outer layer being made of a second metallic material having a softening point substantially similar to the softening point of the first metallic material; and d) cooling the outer layer immediately after extruding.

Preferably, the first metallic material is selected from: aluminium, aluminium alloy, copper, copper alloy.

Preferably, the second metallic material is selected from: aluminium, aluminium alloy, copper, copper alloy.

Preferably, the first metallic material and the second metallic material are the same material.

Preferably, the step of extruding the outer layer onto the reinforcing structure is performed under pressure. Profitably, the extrusion pressure is higher than 500 bars, preferably from 600 bar to 700 bar. Application of pressure during extrusion facilitates the filling of the interstices and speeds the process up, thus minimizing the effect of the heat applied during extrusion on the optical cable.

Preferably, the step of extruding the outer layer onto the reinforcing structure is performed at an extrusion temperature of from 400° C. to 500° C. Advantageously, an extrusion temperature of from 420° C. to 480° C. is applied.

Profitably, the step of extruding the outer layer onto the reinforcing structure is performed at an extrusion speed higher than 20 m/min, more preferably higher than 25 m/min. The extrusion speed can be up to 60 m/min.

Preferably, the step of extruding the outer layer onto the reinforcing structure is performed by an extruder comprising a male die and a female die, wherein the male die and the female die are in a side-by-side relationship.

Preferably, the male die is neckless.

Preferably, the male die is located with the dowsntream end some millimeters, e.g. 3-8 mm, away the upstream end of the female die.

According to another aspect, the present invention relates to a submarine optical cable comprising an optical core comprising a plurality of optical fibers housed in an inner tube, and a reinforcing structure consisting of at least one layer of wires stranded onto the optical core, at least part of the wires being clad with a first metallic material, the reinforcing structure consisting of at least one layer of wires being embedded in an outer layer of a second metallic material, said outer layer being surrounded by a sheath, said cable being substantially devoid of interstices between the wires and the inner tube.

Preferably, the inner tube can be made of metallic material. Preferred metallic materials for the inner tube are stainless steel and aluminium, more preferably aluminium.

Alternatively, the inner tube is made of a polymeric material, preferably polyethylene.

Preferably, the cable comprises a reinforcing structure consisting of one layer of wires. Thanks to the embedding into the outer layer, a single layer of wires provides at least the requested mechanical strength.

Preferably, the first material is selected from: aluminium, aluminium alloy, copper, copper alloy.

Preferably, the second material is selected from: aluminium, aluminium alloy, copper, copper alloy.

Preferably, each of the clad wires comprises a core and a cladding, the core being made of a third metallic material having a softening point substantially higher than the softening point of the first metallic material of the claddings. A preferred third metallic material is steel.

BRIEF DESCRIPTION OF THE DRAWINGS

The present invention will become fully clear by reading the following detailed description, to be read by referring to the accompanying drawings, wherein.

DETAILED DESCRIPTION OF PREFERRED EMBODIMENTS OF THE INVENTION

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Figure 1:
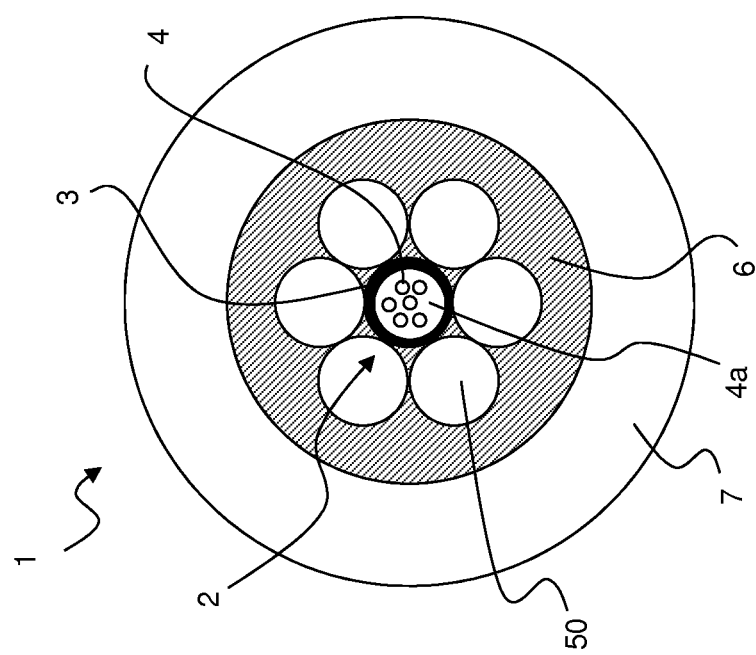
FIG. 1 is a cross-sectional view of a submarine optical communications cable according to the present invention.

FIG. 1 shows a submarine optical communications cable 1 according to the present invention.

The submarine optical communications cable 1 comprises an optical core 2. The optical core 2 in turn comprises an inner tube 3 housing a number of optical fibers 4. By way of mere example, the submarine optical communications cable 1 shown in FIG. 1 comprises six optical fibers 4.

The optical fibers 4 may be of any known type suitable for submarine applications. For instance, the optical fibers 4 may be standard single mode optical fibers compliant with the ITU-T Recommendation G.652 (June 2005). Alternatively, the optical fibers 4 may be NZDS (Non-Zero Dispersion Shifted) optical fibers compliant with the ITU-T Recommendation G.655. The optical fibers 4 are preferably loosely arranged within the axial inner tube 3.

The inner tube 3 may also contain a filling compound 4a of a known type, for instance a tixotropic jelly.

According to alternative embodiments not shown in the drawings, the optical core 2 may have a structure different from that shown in FIG. 1. For instance, instead of being loosely arranged within the inner tube, the optical fibers 4 may be grouped in bundles or micromodules, or in ribbons, which are in turn arranged within the inner tube.

The inner tube 3 may be made of a polymeric material, such as polyethylene, for example, high density polyethylene HDPE (High Density Polyethylene), or of a metallic material, for example steel, for example stainless steel such as AISI 2304 or AISI 316, or aluminium. Optionally, the inner tube 3 may be corrugated.

As an example, the thickness of the sidewall of the inner tube 3 may be comprised between 0.2 and 0.3 mm, in case of stainless steel. In case of aluminium or HDPE, the thickness is preferably greater. For example, said thickness may be comprised between 1.0 mm and 2.5 mm.

The submarine optical communications cable 1 further comprises a number of wires 5. The wires 5 are stranded onto the inner tube 3, so as to form one or more concentric reinforcing layers surrounding the optical core 2. Preferably, the cable of the invention has a reinforcing structure consisting of a single layer. By way of example, the submarine optical communications cable 1 shown in FIG. 1 comprises six wires 5 forming a reinforcing structure surrounding the optical core 2.

Figure 2:
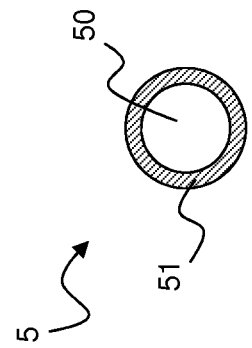
FIG. 2 is a cross-sectional view of a wire comprised in the cable of FIG. 1.

The wires 5 are metal wires. More particularly, with reference to FIG. 2, each wire 5 comprises a core 50 and a cladding 51. The core 50 is made of a third metallic material, while the cladding 51 is made of a first metallic material different from the third metallic material. The softening point of the third metallic material is preferably substantially higher than the softening point of the first metallic material. For example, each wire is made of ACS (Aluminium Clad Steel), i.e. each core 50 is made of steel and the relevant cladding 51 is made of aluminium. The ACS wires may be either standard ACS wires as defined by the document IEC 61232 Ed. 1.0, 09.06.1993 (namely 20SA, 27SA, 30SA or 40 SA), or non-standard ACS wires whose ratio steel/aluminium has a non-standardized value. Alternatively, the core 50 may be made of galvanized steel or an aluminium alloy.

According to alternative embodiments not shown in the drawings, only a part of the reinforcing wires 5 are clad, i.e. comprise the cladding 51. For instance, if the cable comprises R wires (R being for instance an even integer), R/2 wires may be clad and R/2 wires may be unclad. In that case, the wires are preferably arranged so that the clad wires and the unclad wires alternate.

The external diameter of each wire 5 is preferably of from 1 mm to 5 mm, more preferably from 2 mm to 3.5 mm.

The submarine optical communications cable 1 further comprises an outer layer 6 surrounding the reinforcing structure of one or more layer(s) of wires 5. The outer diameter of the outer layer 6 is preferably of from 12 mm to 16 mm, more preferably from 13 mm to 15 mm.

The outer layer 6 is made of a second metallic material. In this way, in case the cable 1 is used in a repeatered submarine optical link, the outer layer 6 advantageously allows powering the optical repeaters of the link.

In particular, the outer layer 6 is made of a second metallic material having a softening point substantially similar to the softening point of the first metallic material of the cladding 51 of the wires 5. For example, the second metallic material can be selected from aluminium, aluminium alloy, copper, copper alloy.

According to particularly advantageous embodiments, the first metallic material and the second metallic material are the same material.

As it will be described in further detail herein after, the outer layer 6 is extruded directly onto the reinforcing structure consisting of at least one layer of wires 5. The temperature and the pressure reached during the extrusion process induce softening of the first metallic material of the claddings 51 of the wires 5. The softened first metallic material flows to advantageously fill the interstices among the wires 5 and also the interstices between the wires 5 and the outer surface of the inner tube 3. Further, the first metallic material of the claddings 51 advantageously intermingles or fuses together with the second metallic material of the outer layer 6 during extrusion, and accordingly forms a substantially solid structure, preventing formation of interstices between the outer layer 6 and the wires 5.

In the submarine optical communications cable 1 the wires 5 are embedded within first and second metallic material. In other words, there are no interstices around the wires 5. The ensemble wires 5/outer layer 6 then advantageously behaves as an integral, highly efficient barrier against moisture penetration, without the need of providing any water-impermeable grease. Further, the ensemble wires 5/outer layer 6 imparts optimal mechanical properties (in particular, an optimal hydrostatic pressure resistance) to the submarine optical communications cable 1.

The submarine optical communications cable 1 comprises a sheath 7 surrounding the outer layer 6. The sheath 7 preferably has a thickness of from 2 mm to 10 mm and an outer diameter of from 17 mm to 25 mm. The sheath 7 is preferably made of a polymeric material, for example of HDPE (High Density Polyethylene). The sheath 7 imparts resistance against abrasions to the submarine optical communications cable 1. The sheath 7 is directly extruded onto the outer layer 6, as it will be described in further detail herein after.

Preferably, the submarine optical communications cable 1 further comprises at least one adhesive layer (not shown in FIG. 1) disposed between the outer layer 6 and the sheath 7. Such at least one adhesive layer improves the adhesion between the outer layer 6 and the sheath 7. Moreover, the at least one adhesive layer contributes to avoid damages within the sheath 7 and, in case of damages, avoids the corrosion propagation. The at least one adhesive layer preferably comprises maleic anhydride grafted polyethylene.

The submarine optical communications cable 1 may comprise further layers (not shown in FIG. 1) surrounding the sheath 7, depending on the application of the cable.

Figure 3:
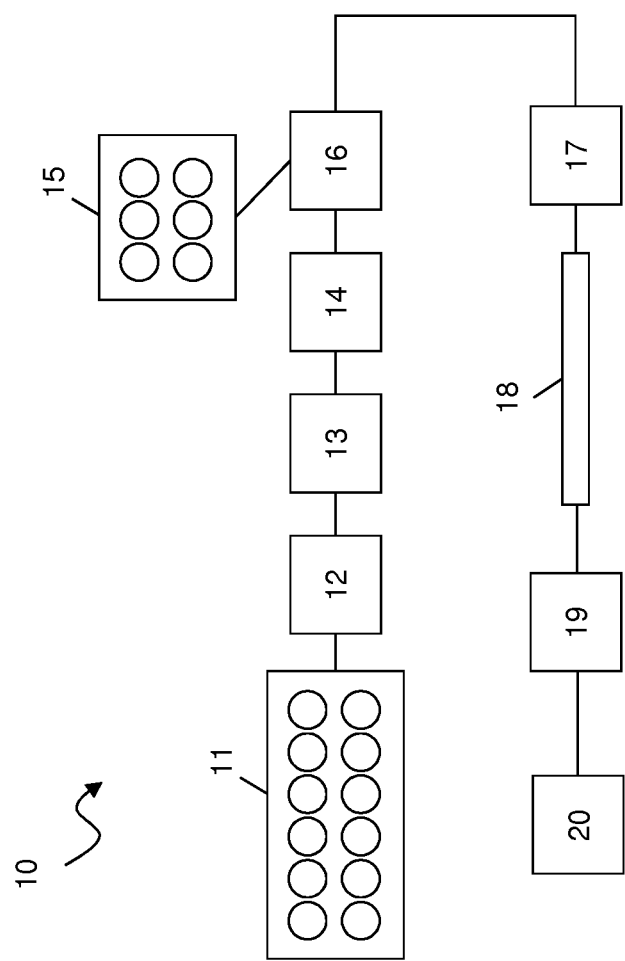
FIG. 3 is a schematic representation of an apparatus for manufacturing the submarine optical communications cable of FIG. 1.

With reference now to FIG. 3, an apparatus for manufacturing the submarine optical communications cable 1 according to a preferred embodiment of the present invention will be now described.

The apparatus 10 comprises a fiber unrolling tool 11, a bundling tool 12, a jelly injection tool 13, a first extruder 14, a wire unrolling tool 15, a winding tool 16, a second extruder 17, a cooling tool 18, a third extruder 19 and a collecting tool 20. The various parts (tools and extruders) of the apparatus 10 are concatenated each other so as to form a single and continuous manufacturing line (or plant).

The fiber unrolling tool 11 comprises N spools of optical fibers (schematically represented by circles in FIG. 3), N being equal to the number of optical fibers 4 to be included in the submarine optical communications cable 1. Similarly, the wire unrolling tool 15 comprises M spools of wires (also schematically represented by circles in FIG. 3), M being equal to the number of wires 5 to be included in the submarine optical communications cable 1.

By the fiber unrolling tool 11, N optical fibers 4 are unrolled from the respective spools and then passed through the bundling tool 12 that preferably loosely groups them, thus forming a fiber bundle.

The fiber bundle is then passed through the jelly injection tool 13 that provides the filling compound 4a (e.g. a tixotropic jelly). This is an optional step.

Then, the fiber bundle is passed through the first extruder 14, that preferably provides by extrusion the inner tube 3 around the fiber bundle. Instead of the first extruder 14, the apparatus 10 may comprise a tool that provides a continuous metal strip, shapes the metal strip in the form of a C-section around the fiber bundle, and finally hermetically seals it by welding or soldering the strip along its longitudinal ends, thereby providing a metallic inner tube 3. Such an alternative is less preferred.

The inner tube 3 with the optical fibers 4 housed therein is passed through the winding tool 16. The winding tool 16 preferably receives M wires 5 unrolled from the spools of the wire unrolling stage 15, and winds them according to an open helix (or "S-Z") pattern onto the inner tube 3, thereby forming one (or more) layers of wires 5.

According to an advantageous variant, the apparatus 10 comprises a die interposed between the winding tool 16 and the second extruder 17. This die preferably has a diameter narrower than the external diameter of the inner tube 3 with the wires 5 wound thereon. This additional step advantageously softens the metallic material of the claddings 51 before extrusion of the outer layer 6. The softened metallic material of the claddings 51 at least partially fills the interstices among the wires 5 and the interstices between the wires 5 and the inner tube 3.

The inner tube 3 with the optical fibers 4 housed therein and the wires 5 wound thereon is then passed through the second extruder 17. The second extruder 17 extrudes the outer layer 6 onto the one or more layer(s) of wires 5. In particular, the outer layer 6 is preferably obtained by extruding a metallic material that, as mentioned above, has a softening point substantially similar to that of the metallic material of which the claddings 51 of the wires 5 are made. The extrusion process is preferably performed at a speed high enough to prevent the heat produced during extrusion from raising the temperature of the elements enclosed within the outer layer 6 (in particular, the optical core 2) to a value that may damage the inner tube 3, the optical fibers 4 or the filling compound 4a, if present. In particular, the extrusion process is preferably performed at a speed higher than 20 m/min, more preferably higher than 25 m/min. For example, the speed of the extrusion process can be up to 60 m/min.

The pressure within the second extruder 17 is preferably higher than 500 bar, and is more preferably of from 600 bar to 700 bar. Further, the extrusion temperature is preferably between 400° C. and 500° C., more preferably between 420° to 480° C. As will be apparent to the skilled in the art, the choice of the temperature depends on the first/second metallic material and on the materials employed for the manufacturing of the optical core 2.

Figure 4:
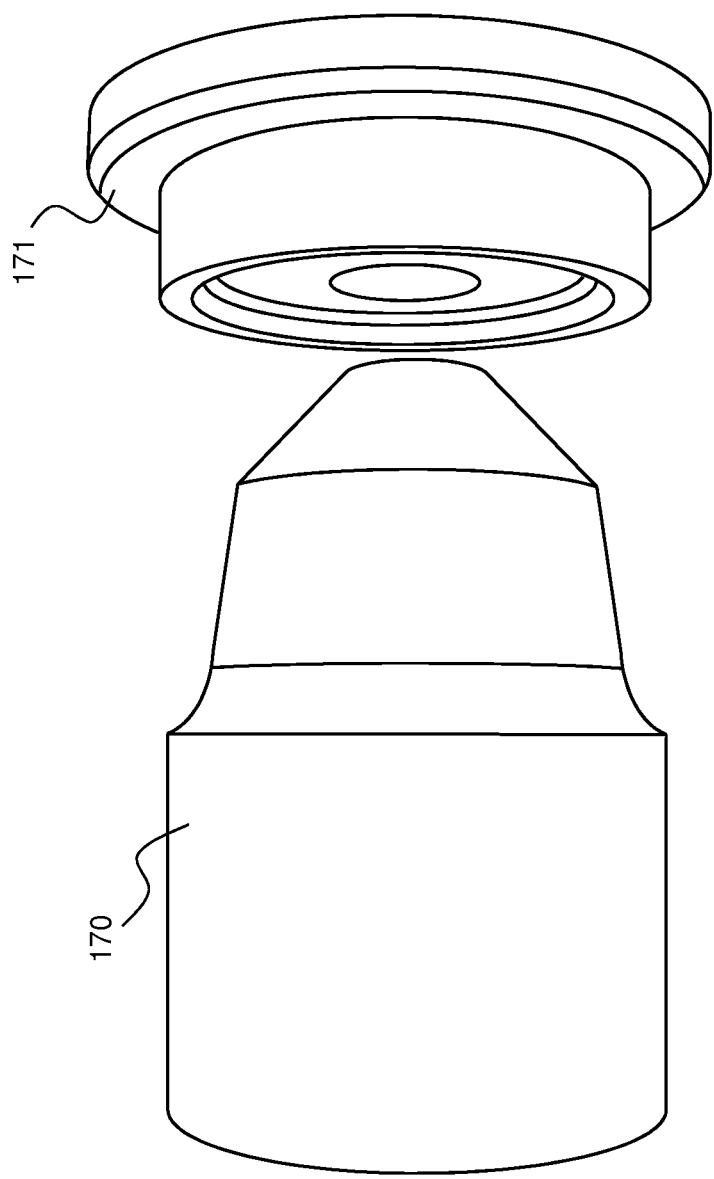
FIG. 4 is a schematic illustration of a configuration female/male extrusion die according to a preferred embodiment of the present invention.

The second extruder 17, as shown in FIG. 4, comprises a male die 170 and a female die 171. The male die 170 is neckless. The male die 170 and the female die 171 are preferably in a side-by-side relationship. In particular, the male die 170 is positioned at some millimeters away from the female die 171. Advantageously, the male die 170 is positioned 4-6 mm away from the female die 171. The extrusion carried out with the die configuration shown in FIG. 4 is advantageously performed under pressure.

As mentioned above, within the second extruder 17, the temperature and the pressure reached during the extrusion process induce softening of the claddings 51 of the wires 5. The softened metallic material of the claddings 51, due also to the pressure values applied in the second extruder 17 (higher than 500 bar), advantageously fills the interstices among the wires 5 and also the interstices between the wires 5 and the outer surface of the inner tube 3. Further, the metallic material of the claddings 51 advantageously fuses substantially together with the metallic material of the outer layer 6, and accordingly prevents formation of interstices between the outer layer 6 and the reinforcing wires 5. The result, as shown in FIG. 1, is that in the submarine optical communications cable 1 the core 50 of the wires 5 are embedded within the metallic material.

Just after extrusion, the outer layer 6 is cooled through the cooling tool 18, where its temperature and pressure are preferably reduced to room temperature and atmospheric pressure, respectively. Preferably, the cooling tool 18 comprises a water bath through which the outer layer 6 is passed. The water bath is such that after few meters in the water bath (i.e. after few seconds, assuming that the speed at which the outer layer 6 is supplied to the water bath is higher than 25 m/min), the temperature of the outer layer 6 and of the elements embedded therein (i.e. the optical core 2 and the wires 5) reaches the room temperature. Cooling the outer layer 6 just after extrusion in such a short time advantageously allows preventing possible damages to the optical core 2, since the heat supplied to the outer layer 6 during extrusion is rapidly removed immediately after extrusion, thereby preventing it from reaching the optical core 2 and raising its temperature to dangerous values.

Then, the outer layer 6 is passed through the third extruder 19 that extrudes the sheath 7 onto the outer layer 6, thereby completing manufacture of the submarine optical communications cable 1. The apparatus 10 may comprise further tools (not shown in the drawings) suitable for providing other layers surrounding the sheath 7, depending on the application of the cable 1.

The submarine optical communications cable 1 is finally collected on one or more collecting drums of the collecting tool 20.

Tests were carried out on a so produced cable. In particular, a submarine optical communications cable comprising an optical core in turn comprising 48 standard single mode optical fibers compliant with the ITU-T Recommendation G.652 embedded in a tixotropic jelly, surrounded by an inner tube made of stainless steel and having an internal diameter of about 3.5 mm and an external diameter of about 4.0 mm was manufactured. The optical core was surrounded by eight wires made of ACS (i.e. 20% IACS, namely 75% of steel and 25% of aluminium), forming a single reinforcing layer. Each of the wires had a diameter of about 2.42 mm. The laylength of the wires was 130 mm. An outer layer of aluminium was extruded onto the wires at a temperature of 460±20° C. under a pressure of 600-700 bar. Finally, a sheath of HDPE was extruded onto the outer layer. The thickness of the sheath was 4 mm. The overall diameter of the resulting cable was 24.2 mm. The measured weight of the resulting cable was 910 kg/km and the measured Rated Tensile Strength (RTS) was 5700 kg. The resulting cable advantageously did not exhibit any interstice around the wires and between the wires and the inner tube. Further, the mechanical properties of the cable (stress strain, ultimate tensile strength, etc.) were tested. A strain margin comprised between 0.5% and 0.6% as in the buffer tube was found. No attenuation of the optical fibres during the stress-strain test was found. A measurement of the Ultimate Tensile Strength (UTS) was about of 7000 Kg (123% of RTS).

Hence, the process for manufacturing a submarine optical communications cable according to embodiments of the present invention has a number of advantages.

First of all, it allows substantially completely filling (or even preventing the formation of) the interstices around the wires 5. Accordingly, the cable manufactured by such a process is provided with a highly efficient barrier against moisture penetration, and has optimal mechanical properties.

On the other hand, cooling the outer layer 6 immediately after extrusion advantageously allows preventing possible damages to the optical fibers 4 of the optical core 2.

Furthermore, the process is very simple, since it is carried out in a single manufacturing step.

The invention claimed is:

1. A process for manufacturing submarine optical communications cable, the process comprising:
   providing an optical core;
   providing a reinforcing structure consisting of at least one layer of wires onto the optical core, wherein at least part of the wires are clad with first metallic material;
   extruding an outer layer onto the reinforcing structure, wherein the outer layer is made of second metallic material having a softening point substantially similar to a softening point of the first metallic material; and
   cooling the outer layer immediately after extruding the outer layer.

2. The process of claim 1, wherein the first metallic material is selected from: aluminum, aluminum alloy, copper, and copper alloy.

3. The process of claim 1, wherein the second metallic material is selected from: aluminum, aluminum alloy, copper, and copper alloy.

4. The process of claim 1, wherein the first metallic material and the second metallic material are substantially the same material.

5. The process of claim 1, wherein extruding the outer layer is performed under pressure.

6. The process of claim 1, wherein extruding the outer layer is performed under a pressure greater than 500 bar.

7. The process of claim 1, wherein extruding the outer layer is performed at an extrusion temperature of from 400° C. to 500° C.

8. The process of claim 1, wherein extruding the outer layer is performed at an extrusion speed greater than 20 meters/minute.

9. A submarine optical cable, comprising:
   an optical core comprising a plurality of optical fibers housed in an inner tube; and
   a reinforcing structure consisting of at least one layer of wires stranded onto the optical core;
   wherein at least part of the at least one layer of wires is clad with first metallic material,
   wherein the reinforcing structure is embedded in an outer layer of second metallic material having a softening point substantially similar to a softening point of the first metallic material,
   wherein the outer layer is surrounded by a sheath, and
   wherein the cable is substantially devoid of interstices between the at least one layer of wires and the inner tube.

10. The submarine optical cable of claim 9, wherein the inner tube is made of polymeric material.

11. The submarine optical cable of claim 9, wherein the inner tube is made of third metallic material.

12. The submarine optical cable of claim 9, wherein the reinforcing structure consists of one layer of wires.

13. The submarine optical cable of claim 9, wherein the first metallic material is selected from: aluminum, aluminum alloy, copper, and copper alloy.

14. The submarine optical cable of claim 9, wherein the second metallic material is selected from: aluminum, aluminum alloy, copper, and copper alloy.

15. The submarine optical cable of claim 9, wherein each of the clad wires comprises a core and a cladding, and
   wherein the core is made of third metallic material having a softening point substantially greater than the softening point of the first metallic material.

16. The submarine optical cable of claim 9, wherein the first metallic material is substantially the same as the second metallic material.

* * * * *